Jan. 27, 1970  A. R. HENSON  3,491,676
MODULAR AIR DOOR CONSTRUCTION
Original Filed Dec. 19, 1966  3 Sheets-Sheet 1
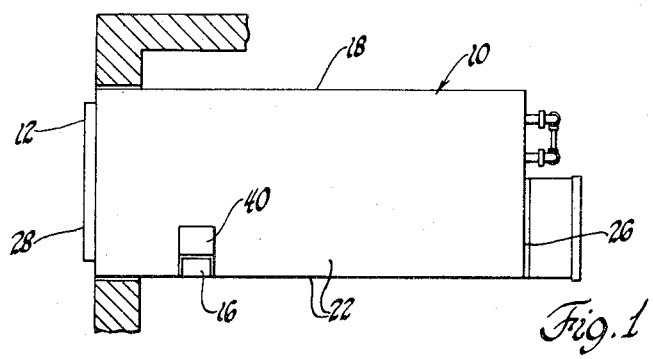
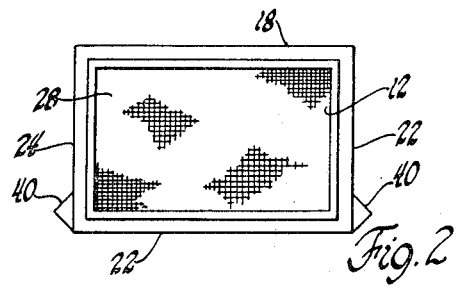
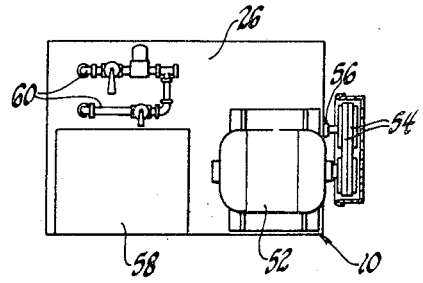
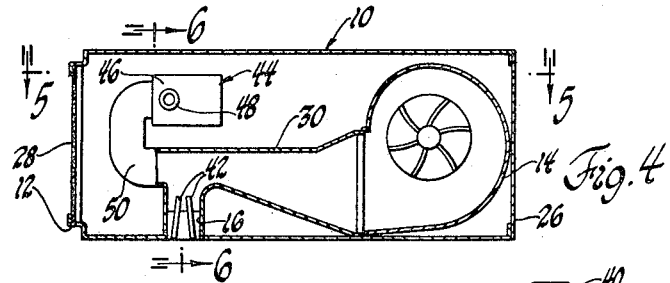
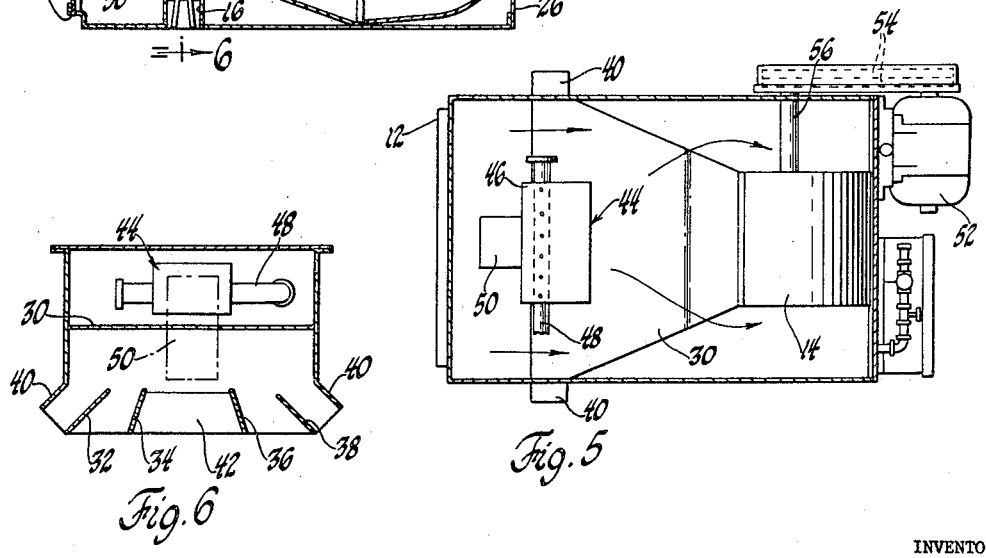
INVENTOR
ARTEL R. HENSON
ATTORNEY Jan. 27, 1970     A. R. HENSON     3,491,676
MODULAR AIR DOOR CONSTRUCTION
Original Filed Dec. 19, 1966     3 Sheets-Sheet 2
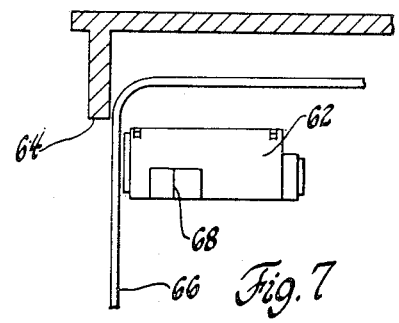
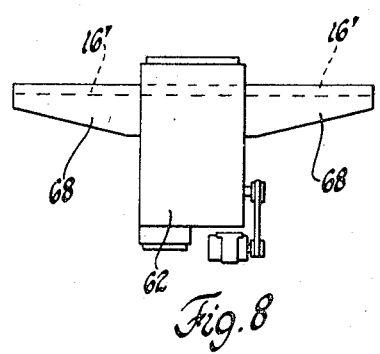
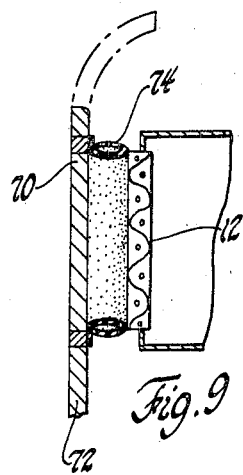
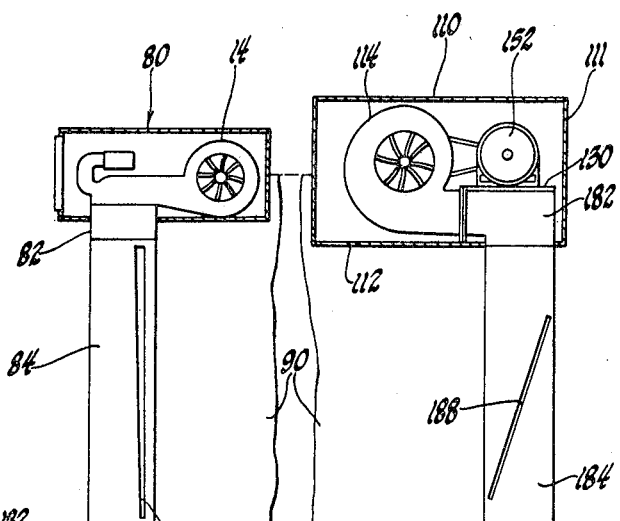
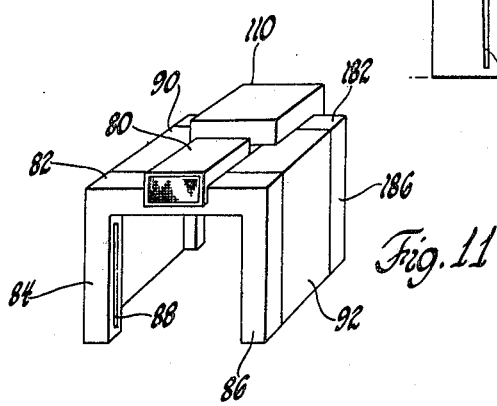
INVENTOR
ARTEL R. HENSON
ATTORNEY Jan. 27, 1970　　　A. R. HENSON　　　3,491,676
MODULAR AIR DOOR CONSTRUCTION
Original Filed Dec. 19, 1966　　　3 Sheets-Sheet 3
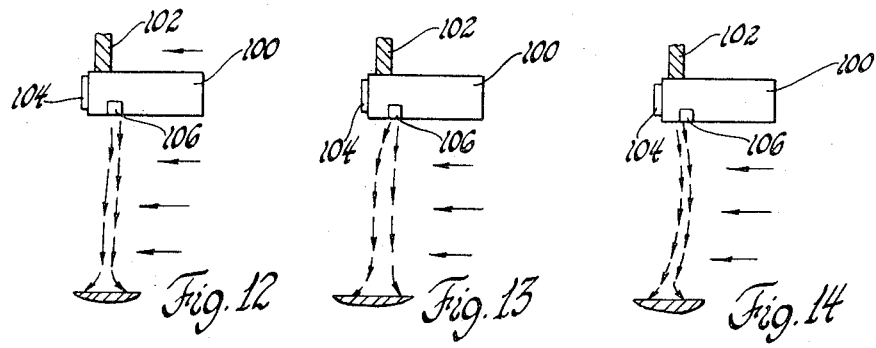
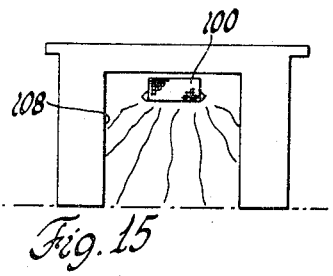
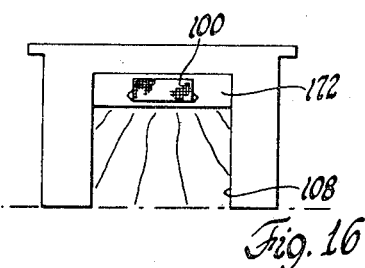
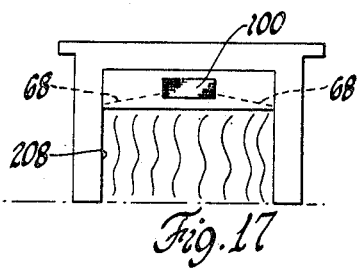
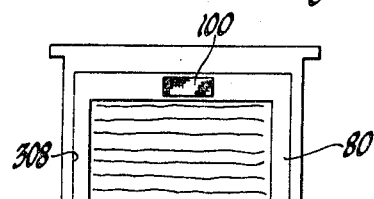
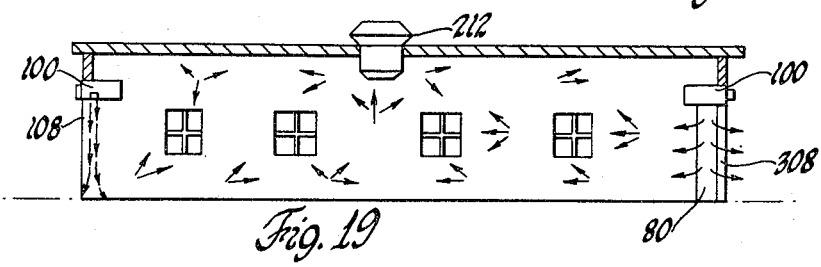
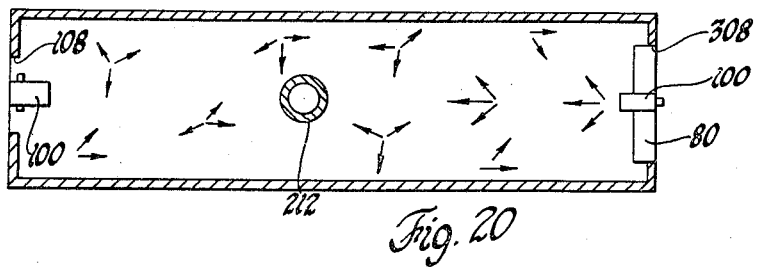
INVENTOR
ARTEL R. HENSON
ATTORNEY

United States Patent Office 3,491,676
Patented Jan. 27, 1970

3,491,676
MODULAR AIR DOOR CONSTRUCTION
Artel R. Henson, Birmingham, Mich., assignor to Disco Engineering, Inc., Detroit, Mich., a corporation of Michigan
Original application Dec. 19, 1966, Ser. No. 602,867. Divided and this application Dec. 2, 1968, Ser. No. 793,635
Int. Cl. F24f 9/00
U.S. Cl. 98—36      4 Claims

ABSTRACT OF THE DISCLOSURE

An air curtain arrangement especially adapted for car wash establishments comprising a pair of free standing air curtain units in back-to-back relationship enclosing a space, air discharge slots formed in standing columns, a blower and heater supported by the columns and separate air intakes for each unit being so arranged that the pressure within the enclosed space is effectively maintained.

---

This is a division of application Ser. No. 602,867 filed Dec. 19, 1966.

This invention relates to air curtain structures in general and more particularly to a modular form of construction for such structures and a secondary use of great significance.

Heretofore, air curtain structures have been designed and built to service different size entranceways and the like. They have usually been built to specifications and made a permanent part of the building structure. Seldom has a unit been serviceable for more than the purpose for which it was originally intended and each new installation has required new and different parts to be fabricated and assembled.

Little or no thought has been given to air curtain structures for serving other than the purpose the name implies of providing an air curtain across an open entranceway or exit.

It is an object of this invention to first teach a modular form of construction for air curtain structures so that one basic unit may be adapted for many different uses.

The basic unit proposed is unique in its own design in providing for continous fresh air flow, direct fired heating, forced air feed to the heating source without secondary blowers, and an air curtain exhaust from the unit that is located sufficiently close to the intake side to assure a weather tight sealing curtain for the opening it is to service.

The particular design of the basic unit proposed also makes the unit more versatile for other uses. It need not be made or considered a permanent part of the building structure within which it is provided. Furthermore, its first use need not be its final use since it can be adapted to serve like but different purposes.

In serving solely as an air curtain structure, the basic unit may be adapted to include lateral extensions to span larger entrance and exit openings. It may also serve as part of a free standing unit installed directly in an entranceway or exit. It may even have the normal door closure mounted on it or be made to cooperate with it in other ways.

The secondary use of the proposed air curtain structures is to serve as a means of pressurizing an enclosed space and, where practical, as the sole or supplementing heating and ventilating source for a building or like space.

Although it is commonly known to use regular heating and ventilating equipment to pressurized an enclosed space, for avoiding drafts and such, it is seldom if ever possible to continue to do so when a large opening to the space is necessary. Air curtains have been used to try to close the opening but the inside equipment can seldom overcome the losses that still exist.

By using the air curtain structure to pressurize the space behind the opening, it allows the regular heating and ventilating equipment to operate as intended and under less load. By locating the means for solving the problem at the source of the problem, the greatest efficiency is obtained. The curtain air is distributed in both relative directions to hold off outside weather and to pressurize the space it serves. As it pressurizes the space in question, it reinforces the air curtain it provides.

Whereas air curtain structures have been designed in the past with only sufficient capacity to serve their prime purpose, it is proposed that their capacity be appreciably greater and sufficient to serve to pressure the space they enclose.

The enclosed space may be a whole building, a service area within a building, or even an air lock or tunnel within the service area.

In the latter respect, it is an object of this invention to teach the use of the modular units in free standing structures that are connected back-to-back. This arrangement provides an enclosed space within which atmospheric conditions may be closely controlled for different purposes.

These and other objects and advantages will best be known and appreciated in the description which follows and has reference to the accompanying drawings.

In the drawings:

FIGURE 1 is a side elevation of the modular unit mounted for direct fresh air intake.

FIGURE 2 is a front view of the intake end of the unit.

FIGURE 3 is an end view of the other or back end of the unit.

FIGURE 4 is a cross-sectional side view of the unit showing its simplicity of construction and arrangement of parts for maximum efficiency.

FIGURE 5 is a top plan view of the unit as seen in the plane of line 5—5 in the previous drawing figure, looking in the direction of the arrows; essentially with the top wall removed.

FIGURE 6 is a cross-sectional plan view through the discharge opening of the structure as seen in the plane of line 6—6 in FIGURE 4 and looking in the direction of the arrows.

FIGURE 7 shows the unit mounted in a free hanging position inside a doorway and relative to an overhead opening door track.

FIGURE 8 is a top plan view of the modular unit with extended plenum chambers for spanning a given access opening.

FIGURE 9 is an enlarged detail, in cross-section of the adaptation for outside air intake through a regular door closure.

FIGURES 10 and 11 are side and front views of the modular unit adapted for use in a free-standing assembly.

FIGURES 12–14 show a modular unit and the air curtain flow under different external conditions.

FIGURE 15 is a front elevational view of a modular unit mounted in an entrance way.

FIGURE 16 is similar to FIGURE 15 with a slight modification.

FIGURES 17 and 18 are similar to the last two drawing figures and shows still further modifications and adaptations.

FIGURES 19 and 20 show a building space in side and top plan views, respectively, with the air curtain structures of this invention used therein.

The modulator unit of construction proposed by this invention for air curtain structures is shown by the first sheet of drawings. It includes a housing 10 having one end open to serve as a fresh air intake 12 and includes a blower 14 for drawing air through the housing and distributing it through the discharge opening 16 provided on the underside of the housing and near the fresh air intake.

The housing 10 is of sheet metal and includes enclosing top, bottom and side walls 18, 20, 22, and 24 respectively. The back end is closed by an end wall 26 and the front end is adapted to receive a louvered screen or the like 28 in the intake opening 12.

The blower 14 is of the radial-flow centrifugal type and is mounted near the back wall 26 in the housing 10 and spaced from the intake opening 12. The sides of the blower are open and spaced from the side walls of the housing for drawing air more uniformly through the enclosed space there within.

Ductwork 30 is provided in the housing 10 between the discharge side of the blower 14 and the discharge opening 16 in the housing. The cross-sectional area of the ductwork is substantially constant but it is extended from a rectangular shape to an elongated and narrower shape conforming to the discharge opening 16 in the bottom wall of the housing.

The air flow through the housing 10 will be appreciated as from the intake opening 12 across and over the ductwork 30 to the blower 14. The blower then moves the air in sufficient volume through the ductwork to exhaust it under greater velocity and pressure through the discharge opening 16 back near the front of the housing.

The discharge opening 16 includes an elongated slot in the bottom wall 20 of the housing and a sereis of vanes 32, 34, 36 and 38 to distribute the air flow side ways in a fan-like manner. The side walls of the housing are formed at the discharge opening, as at 40, to allow a greater lateral distribution of the curtain air and a pair of vanes 42, within the center opening space of the discharge opening, help direct the flow vertically downward.

A decided advantage is obtained in having the discharge opening 16 located near the front of the housing 10. Since the intake opening 12 is disposed relative to the outside of whatever structure or entranceway the air curtain itself is to serve, this places the air curtain itself closer to the opening it is intended to shield. Furthermore, the part of the housing which accommodates the blower 14 may provide there behind whatever distance the size of the blower dictates without adversely affecting the closeness of the air curtain discharge to the entrance or exit way it serves.

To enable the air curtain structure to serve in winter weather and for other purposes, a direct gas fired burner unit 44 is shown mounted within the housing 10.

The burner unit 44 includes a sheet metal enclosure 46, open towards the blower 14, and through which extends a gas line connection 48 to provide the burner inside. It is connected to the discharge ductwork 30 by a passageway member 50 and receives sufficient forced feed for the required combustion rate and to heat and distribute heated air in the housing and back towards the blower.

Fresh air flowing into the housing 10 passes over the burner unit 44 and mixes with the heated air as it flows towards the blower. The burner discharge is also over the ductwork 30 and against the blower housing so that the air flow passages also conduct heat to the passing air stream.

This particular burner arrangement avoids the usual requirement of baffle plates in the housing to restrict the inducted air flow more closely about and through the burner enclosure. In addition, the air feed to the burner is pre-heated by having been mixed with heated air and been conducted through the blower and part of the ductwork and subjected to the heat transfer incident thereto.

All of the operating controls for the modular air curtain structure are provided on the back end of housing. A motor 52 is connected by pulleys 54 to the blower shaft 56, to operate it. There is a control box 58, for electrical wiring and controls, and the gas lines 60 with shut-off and other control valves are also all readily accessible on the back wall of the housing.

The basic air curtain structure described may be mounted in or behind any entranceway to be served. It may have the front end actually projecting through the building wall over an entranceway, as shown in the first drawing figure. Or, it may be mounted in but behind the actual entranceway opening and even behind an overhead opening or other door closure as shown by FIGURES 7 and 9.

In FIGURE 7, a basic unit 62 is shown mounted relatively behind an entranceway 64 with the intake end spaced close to guide teaches 66 for an overhead opening door (not shown).

This particular unit is further adapted to include side extensions 68 which are of sheet metal and are formed to provide plenum chambers in open communication with the normal distribution ductwork 30 in the housing.

The side extensions are best shown by FIGURE 8 as tapered from the housing side walls towards their outer ends, on their back sides, and including discharge slots 16' which are aligned with the one in the bottom wall of the housing itself.

Suitable louvers or baffles, although not shown, may be provided in the lateral extensions and the air curtain flow is directed more vertically downward than the fan-like as before.

When the air curtain structure is hung on overhead supports behind a normal door closure, it may be adapted for use even when the door is closed in front of it. This may be desirable where the air curtain structure also serves as a means of heating the inside building space and pressurizing it as previously mentioned.

This is best accomplished, as shown by FIGURE 9, by providing an opening 70 in the door 72 which will be aligned with the air intake 12 of the curtain structure when the door is closed and which is similar in size to the intake opening. In addition, a flexible passage means 74 is provided about the door opening and extended for engagement about the intake opening when the two are aligned.

This avoids problems of drawing curtain air back into the system for recirculation and assures consistent conditions and temperature control in always using fresh outside air.

The flexible passage means 74 is best secured to the door 72 and made movable with it. This is particularly true with overhead opening doors which travel closer to the upper corner edge of the housing structure in their overhead guided travel.

A still further adaptation of the basic air curtain modular is shown in FIGURES 10 and 11. In fact, two variations are shown which may be used separately or together.

The basic unit, identified as 80, is shown as part of a free standing structure including an overhead plenum chamber part 82 and leg members 84 and 86. The basic unit conveys curtain air into the overhead plenum chamber member and the curtain air is carried into the legs and discharged through slots 88 provided for such purpose.

The free standing unit may be mounted directly in an entranceway and even adapted to receive and support an overhead door for operation thereon.

In FIGURES 10 and 11 the basic unit, as adapted for use as a free standing structure, is shown in a still further combination. It is used with a like unit to provide a tunnel or passageway which permits free traffic flow therethrough and the relative control of atmospheric conditions therewithin.

This combination is best described with reference to its use in a car wash facility as part of the exit way from such an establishment.

As will be appreciated, there is a great deal of humidity in a car washing facility, and it makes it very difficult to do much more than damp dry a car before it leaves the building. Furthermore, most of the manual labor in a car wash is used to try to dry the cars in this final stage of the overall operation.

The combination unit shown includes two air curtain structures of similar construction though not necessarily of like size and output capacity. They are disposed back to back in relatively spaced and aligned relation with closing top and side walls 90 and 92 provided therebetween.

The standard adaptation of the basic structure, in the free standing form, is mounted within or closely adjacent the exitway from the car wash building and the other part of the structure extends some distance into the building. The latter includes the blower housing 110, overhead plenum chamber part 182 and leg members 184 and 186.

The blower 114 in the housing 110 is somewhat larger than the blower 14 in the standard size unit and accounts for the larger size blower housing. In this particular arrangement a blower of greater capacity is needed at the inner end of the enclosed tunnel space to provide an air curtain having sufficient velocity for stripping water from incoming traffic. Otherwise it might be the same as the other unit.

One other difference in the inside unit is that the end wall 111 is closed rather than open and the intake 112 is provided in the bottom wall just beneath and behind the blower 114.

The second unit is also different, in this instance, in not having a burner unit in the housing 110 and having the drive motor 152 mounted inside the housing on the ductwork 130.

Because the inside unit is used for stripping water from incoming traffic, the discharge slots 188 are angled to better serve their intended purpose. However, their air curtain providing function is essentially the same in closing the otherwise open end of the tunnel structure.

The atmospheric control tunnel arrangement provides a structure through which cars pass in leaving the car washing facility. The outer disposed air curtain unit receives fresh outside air, heats it and distributes it to the supporting legs 84 and 86 where it is discharged transversely across the opening between the legs to provide the closing air curtain. Part of the curtain air is received in the space between the two units and it is this heated air which creates the desired atmospheric condition best suited for drying cars passing through without much manual assistance.

The inner disposed air curtain unit draws from the heated air in the space between the two units and circulates it through its own supporting legs 184 and 186 to provide the water stripping air curtain which closes the other end of the open tunnel. By stripping off most of the rinse water on incoming cars, they are much more quickly dried in the warmer atmosphere in the tunnel space. Further, there is continuous ventilation in the tunnel space caused by the curtain air deflected inwardly at both ends and drawn off, in part, through the intake for the inner unit which is located within the enclosed tunnel space.

The curtain air received in the tunnel space from both ends is more than that which is extricated for use by the inside curtain unit so that the air in the tunnel space is constantly mixing and under pressure. This creates a working space in which there are no appreciable drafts, humidity is reduced by the mixing of the dry warm air with the stripping air, and the higher pressure in the work space backs up and reinforces the air curtains at both ends.

As will later be described, the arrangement is similar, in smaller scale, to the use of two air curtain door structures of the type proposed at opposite ends of an open building.

Referring now to FIGURES 12–14:

The basic modular unit 100 is shown as mounted within an entranceway or as through an opening in the overhead wall 102 received between the intake end 104 and curtain air discharging opening 106.

The curtain air is directed downwardly with sufficient velocity to span the opening and form an air wall precluding outside weather and preserving inside conditions. Moreover, part of the curtain air flows into the building space and this is so regulated with any extrication of waste air from the building space, for ventilation or otherwise, to pressurize the internal space.

In pressurizing the building space, the air curtain is backed-up and precluded from flowing or being bent to flow into the building space throughout substantially the full height of the opening it serves.

Since the curtain air is discharged in or immediately adjacent the building opening, due to the forward location of the discharge opening, it is held tight to the entranceway for greater sealing ability than other known air curtain devices. Flow into the building space is principally at the threshold and only as required to obtain the desired internal pressurizing condition.

As shown by FIGURE 13, outside conditions which tend to draw the curtain air outside will split the curtain, but the inside vale remains intact. Similarly, gusts against the curtain as in FIGURE 14 are resisted by the back-up pressure and are carried down and back outside with the outside vale. Only a certain amount of curtain air flows inwardly at the threshold and all else is held off.

FIGURE 15 shows the basic modular unit 100 in an entranceway 108 and with the curtain air fanned out therebelow. In this arrangement there are seemingly unprotected areas at the upper corners of the entranceway. However, in such an arrangement the inside space is allowed to exhaust through these corner areas and hold off the outside air.

FIGURE 16 shows the use of a cover screen 172 across the top of the entranceway 108 which is used when the inside air is exhausted by other ventilating means. This may be a permanent cover screen or it may be provided with an overhead opening door formed to include the passage means of FIGURE 9 at its lower extremity.

FIGURE 17 shows the same arrangement with the lateral extensions 68 used to span a large entranceway 208 to provide a more directly downward air curtain flow. As before, a cover screen or passageway in an overhead opening door may be used if needed.

FIGURE 18 shows the basic unit 100 as the free standing structure 80 used to span an even larger entranceway 308.

The alternative arrangements offered by the modular construction of this invention are best discussed with reference to FIGURES 19 and 20.

The basic unit 100 may be installed in the entranceway 108 to a building which has its own heating and ventilating system and it will serve both to pressurize the enclosed space and supplement the other heating and ventilating equipment.

If the entranceway is enlarged, the basic unit may be adapted for lateral extensions or to provide a free standing unit, 80 as shown in the opening 308 at the other end of the building.

If the whole building is enlarged, the regular heating and ventilating equipment needs replacing, or throughflow open entranceways are required, another air curtain unit may be installed in the other entranceway starting with the basic unit or whatever modular unit may be required.

In the ideal arrangement, air curtain structures of sufficient capacity in combination to pressurize, heat and otherwise provide for the whole building space are used at different entrance or exit ways. For ventilation or the extrication of waste air, an exhaust blower 212 is provided between the two air curtain structures and is balanced with them so that the building space is still under pressure to back up the air curtains and prevent drafts within the building space.

Regardless of the particular type of modular unit used, the positive pressure in the building space assures a multiple directional flow free of drafts, reaching and warming all external walls and providing ideal working conditions for personnel.

Although not previously mentioned, it will be appreciated that the modular unit may be made in several sizes. In this way the smaller unit in its different combinations can cover a range of openings and service certain size buildings and the larger units in their different combinations can accommodate the next larger size openings and building spaces.

The manufacturer needs to stock only two or three sizes of basic units to accommodate a very broad range of possibilities.

Without further discussion, the scope of this invention is defined within the hereinafter appended claims and the only limitations to be applied are within the specific language set forth.

I claim:

1. Means for providing an enclosed space allowing free traffic flow therethrough and the relative control of atmospheric conditions therewithin, and comprising:

a pair of air curtain structures of like construction disposed in back-to-back and relatively aligned spaced relation and having top and side walls provided therebetween forming an enclosed space therewithin, said air curtain structures each being formed and disposed to provide a passageway for traffic flow relative thereto and for discharging curtain air transversely across said passageways and at least partially within said enclosed space for pressurizing said space beyond atmospheric conditions externally thereof, a fresh air intake provided in an outer disposed end wall of one of said air curtain structures and means provided there behind for pre-conditioning intake air for discharge across the traffic passageway thereof and within said enclosed space, and means provided within said enclosed space for the extrication of waste product air and ventilation of said enclosed space without disruption of the pressurization thereof by said air curtain structures.

2. The space enclosing means of claim 1, said extrication means being provided within the other of said air curtain structures and serving as an air intake therefor.

3. The space enclosing means of claim 2, said other air curtain structure including a blower of sufficient capacity for both the extrication of air from said enclosed space and the air curtain providing discharge thereof with sufficient velocity for stripping water and the like from incoming traffic.

4. The space enclosing means of claim 3 said air curtain structures being provided in substantially back-to-back contiguous relation for providing an air-lock tunnel space receptive within a building entranceway.

References Cited

UNITED STATES PATENTS 3,308,740    3/1967    Henson et al. _____ 98—36

WILLIAM E. WAYNER, Primary Examiner

US. Cl. X.R.

263—50